United States Patent [19]

Murayama

[11] Patent Number: 5,105,472
[45] Date of Patent: Apr. 14, 1992

[54] GRAPHIC REPRODUCTION METHOD

[76] Inventor: Noboru Murayama, No. 4-5-13, Narusedai, Machida-Shi, Tokyo, Japan

[21] Appl. No.: 489,094

[22] Filed: Mar. 6, 1990

[30] Foreign Application Priority Data

Mar. 9, 1989 [JP] Japan .................................. 1-57488

[51] Int. Cl.⁵ .............................................. G06K 9/00
[52] U.S. Cl. ...................................... 382/22; 340/703; 382/56; 395/141
[58] Field of Search .................... 382/56, 22; 340/703, 340/728, 747; 358/22, 81, 82; 364/518, 526

[56] References Cited

U.S. PATENT DOCUMENTS 4,754,488 6/1988 Lyke ....................................... 382/22
4,955,061 9/1990 Doi et al. ............................... 382/56

Primary Examiner—Leo H. Boudreau

[57] ABSTRACT

A graphic reproduction method includes a first step for scanning a contour of a predetermined graphic that has been read from a storage source that stores contours of graphics, to detect a black change dot $P_B$ and a white change dot $P_W$ for each scan, and storing data of said black change dot $P_B$ and white change dot $P_W$ in a change dot memory, and a second step for scanning said change dot memory in which data of said black change dot $P_B$ and a white change dot $P_W$ have been stored, and for each scan, to generate a black line signal for making black from a black change dot $P_B$ to a dot immediately before a white change dot $P_W$.

5 Claims, 6 Drawing Sheets

GRAPHIC REPRODUCTION METHOD

BACKGROUND OF THE INVENTION

The present invention relates to a method for the reproduction of a portion inside a contour as a black painted graphic, and more particularly to a graphic reproduction method suitable for outline fonts that express contour lines as formulae.

Outline fonts that express contour as formulae enable processing such as enlargement, reduction and rotation and the like, and have come to be used instead of the dot fonts that have been conventionally used.

However, the largest problem with outline fonts is the processing speed. The problem with respect to this is that more than half of the processing time is taken for the painting of the portion inside the contour.

Conventionally, one of the methods which is used to raise this painting speed is for example, the one disclosed in Japanese Patent Publication No. 53-41017.

As is indicated in FIG. 1, this method comprises a step 10 in which the entire contour of the graphic dot display to be reproduced is stored in a memory, and a step 11 in which this memory is successively scanned in a primary scanning direction (x) and black dot is determined where each of the scan lines and the said contour intersect, and portions between the first black dot and the second black dot are painted black.

In this method, as will be described below, misoperation causes an incorrect graphic to be reproduced.

For example, in the case of the contour indicated in FIG. 5A, only one black dot exists on the scan line for the portion of dots "111" and "112". Because of this, as indicated in FIG. 2, the portion in the x direction from the dots "111" and "112" is mistakenly painted black as indicated by numbers 13 and 14. As the result, the produced graphic differs from the graphic indicated in FIG. 5C, that is to be reproduced.

In addition, the entire contour of the graphic is stored once in the memory and so the number of dots that have to be stored increases and the storage process takes time, making it difficult to increase the processing speed for the reproduction of graphics.

SUMMARY OF THE INVENTION

Accordingly, it is a general object of the present invention is to provide a novel and useful graphic reproduction method in which the above described problems have been eliminated.

Another object of the present invention is to provide a graphic reproduction method in which coordinates of a dot to change to white and a dot to change to black for each of the scan lines in a contour of a graphic are determined and stored in a memory, and then the memory is successively scanned and a portion from a dot to change to black to a dot immediately before a dot to change to white is painted black.

By the method of the present invention, even in cases where a contour consists of a single line extending in the direction perpendicular to a primary scanning direction, a pair of a dot to change to black and a dot to change to white can be obtained for each of the scan lines that scan this contour. Accordingly, there never occur reproduction of an erroneous graphic such that the portion on the side of the direction of the primary scanning line from the contour is painted black and so that the correct graphic is reproduced.

In addition, the data the dots that are stored in the memory are limited to the data of the dots to change to black and the dots to change to white and so the data of dots stored in the memory is considerably less than the conventional case where the data of the entire contour was stored. By this, it is possible to improved the speed of processing for the reproduction of graphics.

Other objects and further features of the present invention will be apparent from the following detailed description when read in conjunction with the accompanying drawings.

DESCRIPTION OF THE PREFERRED EMBODIMENTS

Figure 4:
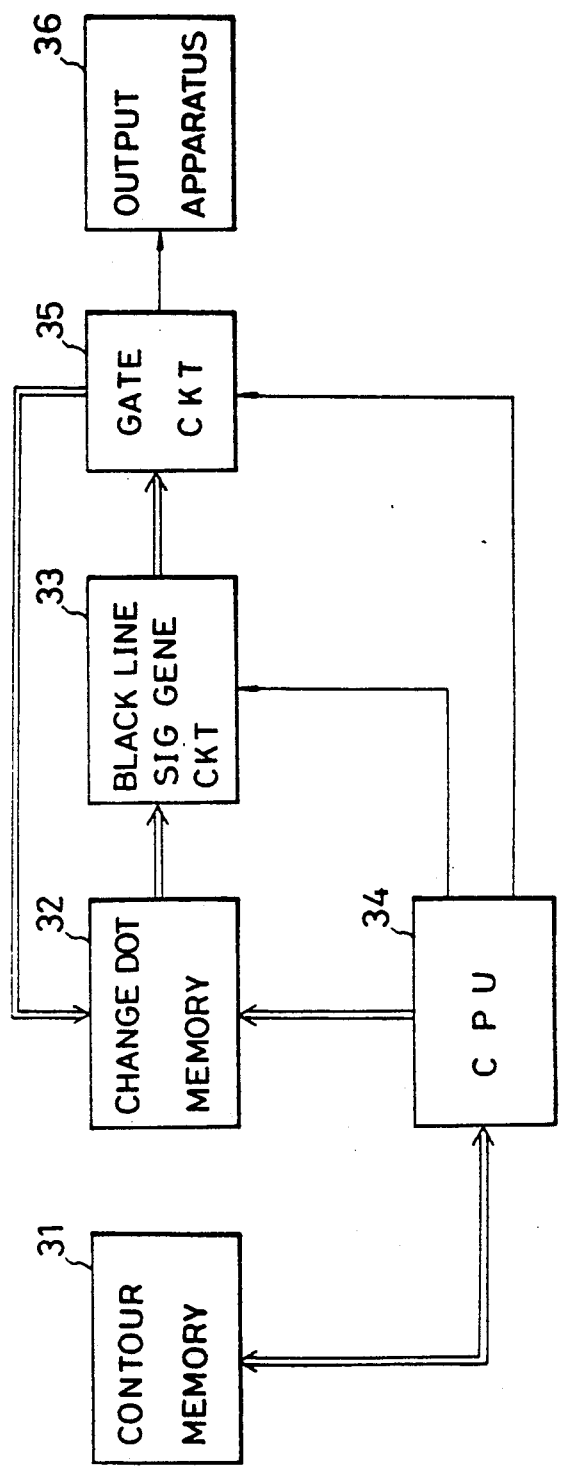
FIG. 4 is a block diagram of an apparatus for implementing the graphic reproduction method according to the present invention.

For the sake of convenience of explanation, the description will commence with the configuration of the embodiment indicated in FIG. 4.

A contour memory 31 stores information relating to contours of graphics.

Here, a contour consists of an outside contour and an inside contour. An outside contour means a line where the inside thereof is black (i.e. a black contour) and an inside contour means a line where the inside thereof is white (i.e. a white contour).

Outline fonts generally comprise a black contour and a white contour.

A change dot memory 32 stores the data of the head dot (hereinafter referred to as a black change dot) $P_B$ of a black line, and the data of the head dot (hereinafter referred to as a white change dot) $P_W$ of a black line in the manner to be described later.

A black change dot means a head dot where color is changed from white to black when scanning the graphic corresponding to the contour.

A white change dot means a head dot where color is change from black to white when scanning the graphic corresponding to the contour.

A black line signal generator circuit 33 comprises a flip-flop circuit and is set and reset as described below, by a CPU 34. That is to say, "0" is set at the head of each of the scan lines, "1" is set at the black change dot $P_B$, and "0" is set at the white change dot $P_W$, both of which are read from the change dot memory 32.

A gate circuit 35 is under the control of the CPU 34 and the signals of the black line signal generator circuit 33 are sent to an output apparatus 36 in synchronization with the scan of the change dot memory 32 as described below The output apparatus 36 is for example, either a CRT display or a printer.

Furthermore, in addition to the above described operation under the control of the CPU 34, the gate circuit 35 also performs the following operation (1) or (2ll ).

(1) The signals from the black line signal generator circuit 33 are returned to the change dot memory 32.

When this occurs, the signals of the black line signal generator circuit 33 are rewritten to the change dot memory 32 and a graphic that has been painted black is stored in the change dot memory 32.

(2) The signals from the black line signal generator circuit 33 are sent to the output apparatus 36 and at the same time are returned to the change dot memory 32.

In these cases, the graphic is reproduced by the output apparatus 36 and simultaneously, the graphic that is painted black is stored in the change dot memory 32.

In addition, the CPU 34 is the CPU for the processing and control of the microprocessor and the like and in addition to the control operations described above, also performs the following operations.

(1) Operation to read control points of contour information of a desired graphic from the memory 31.

(2) Operation to detect the black change dot $P_B$ and the white change dot $P_W$ in accordance with the rules to be described later, for the read control points of contour information of the desired graphic.

(3) Operation to store the data of the detected white change dot $P_W$ and the black change dot $P_B$ at the corresponding memory locations in the change dot memory 32.

(4) Operation to successively scan the change dot memory 32 in which the data of the black change dot $P_B$ and the white change dot $P_W$ have been stored and read the change dot information.

(5) Operation to send the read change dot information to a black line signal generator circuit 33.

The following will be a description of the method of determining the black change dot $P_B$ and the white change dot $P_W$.

The general rule for the determination of these change dots is as described below.

On an x-y coordinate having the control points of contour information read from the contour memory 31, the direction of the primary scan is made x, and the direction of the secondary scan is made y. The direction of the secondary scan is divided into sections where y increments by 1, and where y decrements by 1.

(1) In the section where y increments, for when $x_j = f(y_j)$, $x_j$ is determined as $y_j(j=1, i+1, \ldots, i+(n-1))$ and $P_B(x_j, y_j)$ is plotted.

(2) Also, for the y decrement section, $x_j$ is determined as $y_j(j=1, i-1, \ldots, i-(n-1))$ and $P_W(x_j+1, y_j)$ is plotted.

(3) For sections where y is constant, both of the ends of the section where y is constant are considered to be included in the section where y changes, and no change dots are plotted.

Moreover, the use of a Bezier curve for contour expression of character fonts is known. If, as in a Bezier curve, contour generation formula uses the parameter t, to give $$x = f(t)$$

$$y = g(t)$$

then $t_j = g(y_j)$ and so $t_j$ can be determined for when y changes, and this $t_j$ can be used to determine $x_j = f(t_j)$ and then plot $P_B(x_j, y_j)$, $P_W(x_j+1, y_j)$.

Figure 5A:
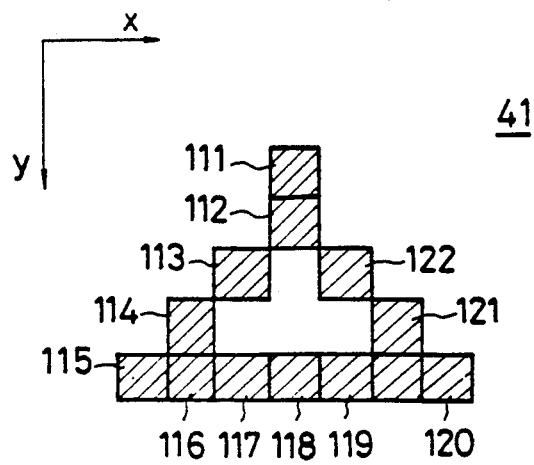
FIG. 5A is a diagram indicating a contour of a graphic.
Figure 5B:
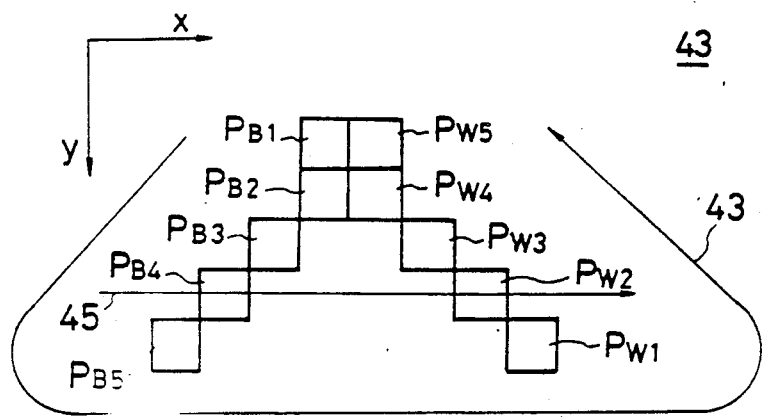
FIG. 5B is a diagram indicating a pattern of dots to change to black and dots to change to white for the contour of FIG. 5A.
Figure 5C:
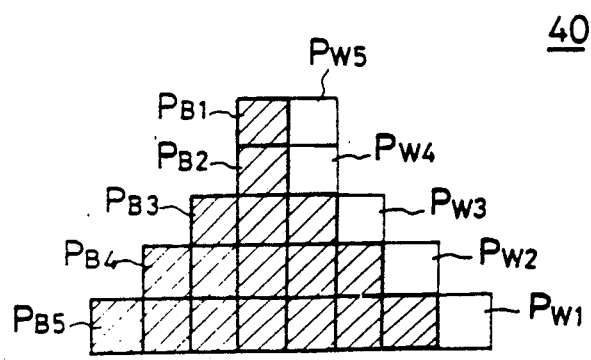
FIG. 5C is a diagram indicating a reproduced graphic.

The following is a description of the graphic reproduction method of the present invention, with reference to the example where the graphic indicated in FIG. 5C is reproduced.

Figure 3:
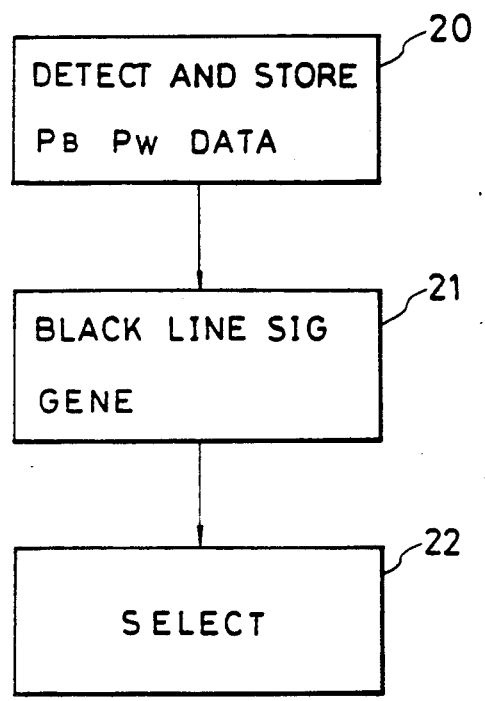
FIG. 3 is a diagram indicating a first embodiment of a graphic reproduction method according to the present invention.

In FIG. 3, in the first step 20, the following operations are performed by the memory 31, the change dot memory 32 and the CPU 34 in FIG. 4.

(1) The outside contour 41 of FIG. 5A which is the contour of the graphic 40 of FIG. 5C, is read from the memory 31 in FIG. 4.

The outside contour 41 is a closed loop written so as to successively join the dots 111→112 →113 115→. . .→120→121→122→112→111.

(2) This outside contour 41 is scanned and the black change dot $P_B$ and the white change dot $P_W$ are determined for each scan and in accordance with the previously described rules (1), (2) and (3).

The section for the dots 111→115 is a section where y increments.

The section for the dots 120→111 is a section where y decrements.

The section for the dots 115→120 is a section where y is constant.

As is indicated in FIG. 5B, in the section where y increments, the black change dots $P_{B1}$ through $P_{B5}$ are detected on the basis of the previously described rule (1) and a data value "1" is stored in the change dot memory 32 at memory locations corresponding to the coordinates of the black change dots $P_{B1}$ through $P_{B5}$.

In the section where y decrements the white change dots $P_{W1}$ through $P_{W5}$ are detected on the basis of the previously described rule (2) and a data value "1" is stored in the change dot memory 32 at memory locations corresponding to the coordinates of the white change dots $P_{W1}$ through $P_{W5}$.

In the section where y is constant, the data value is reset as it is, on the basis of the previously described rule (3).

By this, the change dot pattern 42 indicated in FIG. 5B is stored in the change dot memory 32.

As can be understood by the above, this change dot pattern 42 is written in the counterclockwise direction as indicated by the arrow 43, in the change dot order of $P_{B1} \rightarrow P_{B2} \rightarrow \ldots P_{B5} \rightarrow P_{W1} \rightarrow P_{W2} \rightarrow P_{W5}$.

In the second step 21 in FIG. 3, the CPU 34, the change dot memory 32 and the black line signal generator circuit 33 in FIG. 4 perform the following operations.

The change dot memory 32 is scanned and the change dot pattern 42 stored there is read and sent to the black line signal generator circuit 33.

For each scan line which scans the change dot memory 32, the output signal level of the circuit 33 is set to "1" at every odd numbered memory location which stores the data value "1" and is reset to "0" at every even numbered memory location which stores the data value "1".

For example, for the scan line 45 passing through memory locations corresponding to the coordinates of the dots $P_{B4}$ and $P_{W2}$, the output signal is set to "1" at the memory location corresponding to the coordinates of the dot $P_{B4}$ and is reset to "0" at the memory location corresponding to the coordinates of the dot $P_{W2}$. Accordingly, there is generated a black line signal which has signal level "1" (i.e. a black line) from the memory location for the dots $P_{B4}$ to the memory location immediately before the memory location for the dot $P_{W2}$.

In FIG. 3, in the third step 23, the CPU 34 and the gate circuit 35 of FIG. 4 select and perform either one the following three operations.

(1) The black line signal from the black line signal generator circuit 33 is sent to the output apparatus 36. As indicated in FIG. 5C, the output apparatus 36 displays the graphic 40 which has been painted black from the black change dot to the dot immediately before the white change dot"

(2) The black line signal is rewritten to the change dot memory 32. By this, the graphic 40 indicated in FIG. 5C is stored in the memory.

(3) The black line signal is sent to the output apparatus 36 and at the same time is rewritten to the change dot memory 32.

The following is an explanation of the advantages of the graphic formation method which is described above.

(1) As can be understood from FIG. 5B, a black change dot $P_B$ and the white change dot $P_W$ form a pair for each of the scan lines.

Here, the pairs are $P_{B1}$ and $P_{W5}$, $P_{B2}$ and $P_{W4}$, $P_{B3}$ and $P_{W3}$, $P_{B4}$ and $P_{W2}$ and $P_{B5}$ and $P_{W1}$.

Figure 1:
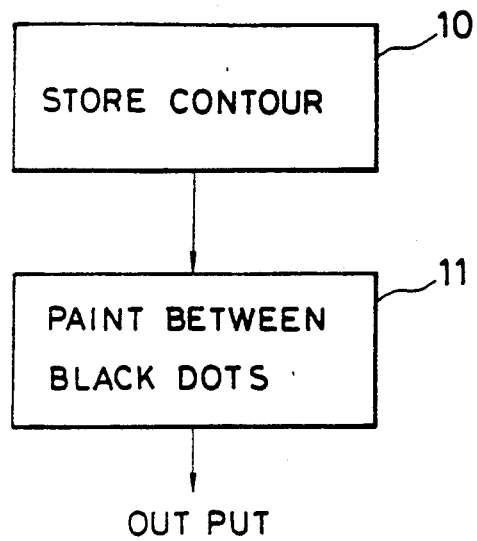
FIG. 1 is a diagram indicating an example of a conventional graphic reproduction method.
Figure 2:
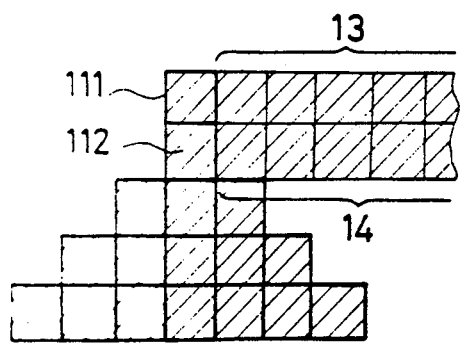
FIG. 2 is a diagram indicating an example of a graphic that has been erroneously reproduced by a conventional graphic reproduction method.

Because of this, there is not an odd number of change dots ("1") on the scan line and so misoperation where an area is painted black instead of being white as indicated in FIG. 2 do not occur.

(2) For storing the entire contour 41 of FIG. 5A in the memory, it is necessary to write a total of 15 dots. However, storing the change dot pattern 42 of FIG. 5B requires only 10 dots.

Accordingly, the graphic 40 indicated in FIG. 5C can be reproduced at a higher speed when compared to the conventional method.

Figure 6A:
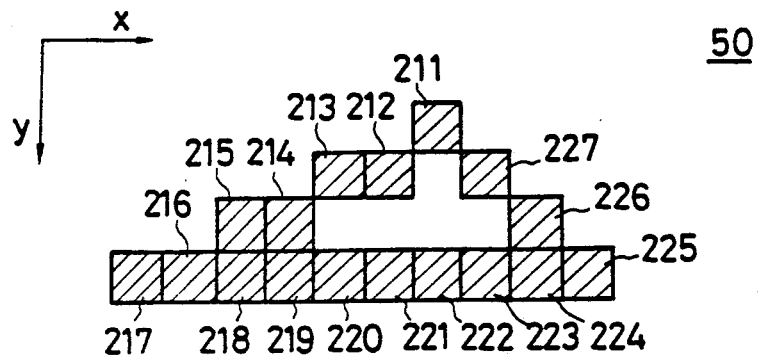
FIG. 6A through FIG. 6C are diagrams indicating contour lines, patterns of dots to change to black and dots to change to white, and reproduced graphic for another graphic.
Figure 6B:
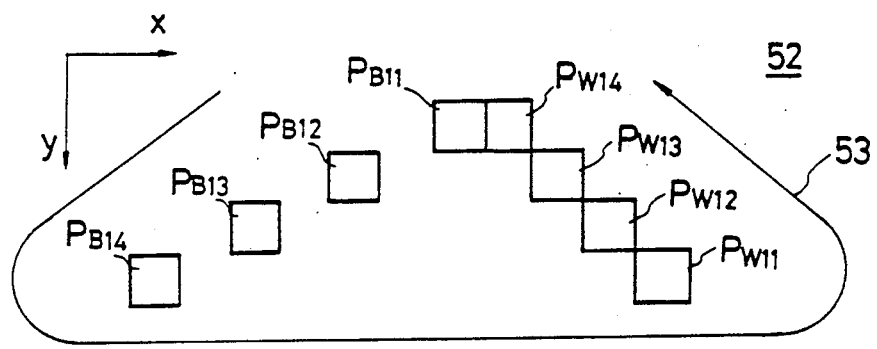
Figure 6C:
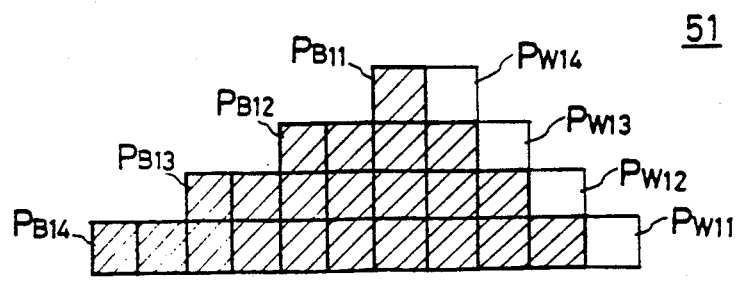

The following is a description of the reproduction of the graphic 51 of FIG. 6C, which is a triangle having a wide base.

An outside contour 50 in FIG. 6A i: the contour of the graphic 51 of FIG. 6C, and is a closed loop written in the order of 211→...→217→225→226→227→211.

When this contour 50 is scanned in the same manner as has been previously described, it is plotted in the order of black change dot $P_{B11}→P_{B12}→P_{B13}→P_{B14}→$white change dot $P_{W11}→P_{W12}→P_{W13}→P_{W14}$ in the counterclockwise direction indicated by the arrow 53 in FIG. 6B, and the change dot pattern 52 is stored in the change dot memory 32.

This change dot memory 32 is scanned and the black line signals are obtained and the graphic 51 indicated in FIG. 6C is reproduced.

In the case of the example indicated in FIG. 6A, it requires a total of 19 dots in order to write the entire contour 50. However, it requires only 8 dots which is less than half of 19, in order to write the change dot pattern 52 of FIG. 6B.

As can be seen from the case of this example, the difference becomes large for the lines in the direction of the primary scan and superiority of the change dot write method over the contour line write formula method becomes greater. Accordingly, in the case of Kanji(Chinese character), the superiority is even greater for outline fonts where there are a large number of horizontal lines.

Figure 7A:
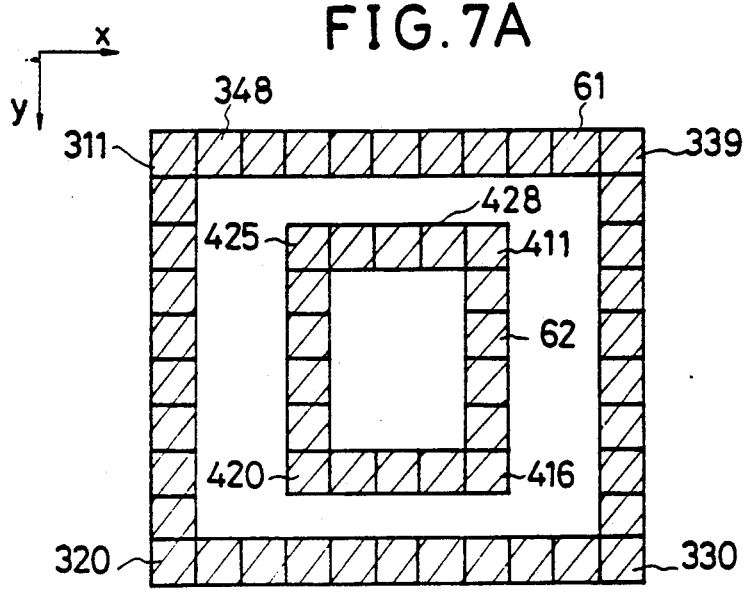
FIG. 7A through FIG. 7C are diagrams indicating outside contour and inside contour, patterns of dots to change to black and dots to change to white, and reproduced graphic for still another graphic.
Figure 7B:
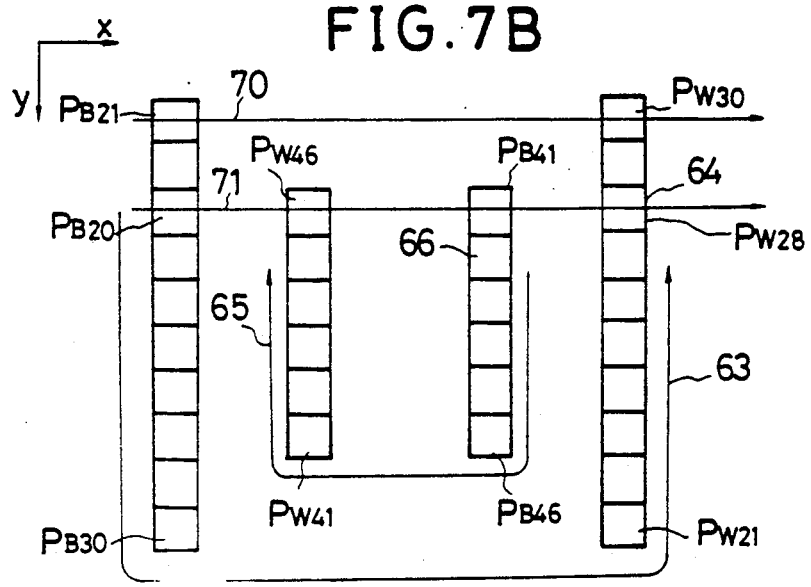
Figure 7C:
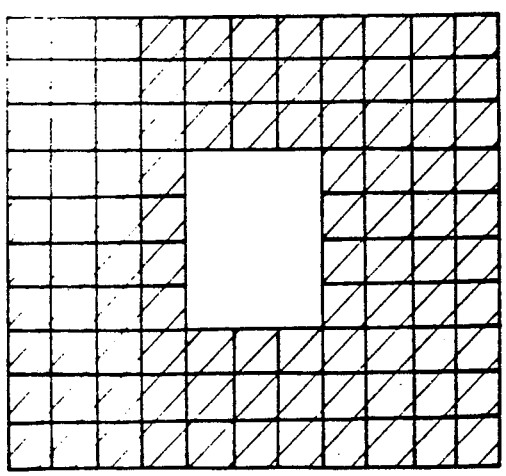

The following is a description of the reproduction of the graphic 60 of a rectangular frame shape indicated in FIG. 7C.

FIG. 7A is a contour line of the graphic 60 indicated in FIG. 7C and comprises an outside contour 61 having the dots 311→320→330→339→348 and an inside contour 62 having the dots 411→416→420→425→428.

The outside contour 61 and the inside contour 62 are scanned simultaneously in the same manner as has been described havetofore.

By this scan, the outside contour 61 has the change dots scanned in the order of the black change dot $P_{B21}→...→P_{B30}→$white change dot $P_{W21}→...→P_{W30}$, and the change dot pattern 64 is detected in the counterclockwise direction indicated by the arrow 63 and the data thereof is stored in the change dot memory 32.

The inside contour 62 has the change dots scanned in the order of the black change dot $P_{B41}→...→P_{B46}→$white change dot $P_{W41}→...→P_{W46}$, and the change dot pattern 66 is detected in the clockwise direction indicated by the arrow 64 and the data thereof is stored in the change dot memory 32.

This change dot memory 32 is scanned and the black line signals are obtained.

The black line signal for the scar line 70 passing through the change dots $P_{B21}$ and $P_{W30}$ becomes a signal which is set to "1" at the black change dot $P_{B21}$ and is reset to "0" at the white change dot $P_{W30}$.

The black line signal for the scan line 71 passing through the change dots $P_{B23}$, $P_{W46}$, $P_{B46}$ and $P_{W28}$ becomes a signal which is set to "1" at the black change dot $P_{B23}$ and is reset to "0" at the white change dot $P_{W46}$, set to "1" again at the black change dot $P_{B41}$ and reset to "0" at the white change dot $P_{W28}$.

By this black line signal, the section between the outside contour 61 and the inside contour 62 in FIG. 7A is painted black and the graphic 60 of FIG. 7C is reproduced.

In addition, the method of determining the black change dot $P_B$ and the white change dot $P_W$ is not limited to the method described above, but can also be the reverse of the above described method.

This is to say that:

(1) In those sections where y increments, for when $x_j = f(y_j)$, $x_j$ is determined as $y_j (j=1, i+1, ..., i+(n-1))$ and $P_W(x_j, y_j)$ is plotted.

(2) Also, for the y-decrement section, $x_j$ is determined as $y_j (j=1, i-1, ..., i-(n-1))$ and $P_B(x_j+1, y_j)$ is plotted.

(3) For sections where y is constant, the method is the same as that which has been previously described.

Furthermore, the present invention is not limited to these embodiments but variations and modifications may be made without departing from the scope of the present invention.

What is claimed is:

1. A graphic reproduction method, comprising:
   a) a first step for scanning a contour of a predetermined graphic that has been read from a storage source that stores control points of contour information of graphics,
   wherein, given a primary scanning direction x and a secondary scanning direction y, said contour is expressed a formula $x=f(y)$, and the direction of the secondary scan is divided into a section where y increments by 1 and a section where y decrements by 1, the first step includes:
1) detecting black change dots $P_B(x, y)$ in one of said two sections while one of the incrementing and decrementing is performed,
2) detecting white change dots $P_W(x+1, y)$ in another of said two sections while another of incrementing and decrementing is performed, and
3) performing nothing with respect to a section where only x changes for the same y, assuming that both ends of said section where x changes are made to be included into said section where y changes, and storing data of said black change dot $P_B(x, y)$ and white change dot $P_W(w+1, y)$ in a change dot memory, and b) a second step for scanning said change dot memory in which data of said black change dot $P_B(x, y)$ and a white change dot $P_W(x+1, y)$ have been stored, and for each scan, generating a black line signal for making black from a black change dot $P_B(x, y)$ to a dot immediately before a white change dot $P_W(x+1, y)$.

2. The graphic reproduction method as claimed in claim 1 wherein in case where a contour of a graphic comprises an outside contour and an inside contour, said first step includes:
detecting a plural number of pairs of a black change dot $P_B(x, y)$ and a white change dot $P_W(x+1, y)$ and storing data of said plural number of pairs of black change dot $P_B(x, y)$ and white change dot $P_W(x+1, y)$ in said change dot memory.

3. The graphic reproduction method as claimed in claim 1 wherein said first step includes:
detecting black change dots $P_B(x, y)$ in the section where y increments by 1,
detecting white change dots $P_W(x+1, y)$ in the section where y decrements by 1, and
performing nothing with respect to a section where only x changes for the same y, assuming that both ends of a section where x changes are made to be included into said section where y changes.

4. The amended graphic reproduction method as claimed in claim 1 wherein said first step includes:
detecting white change dots $P_W(x, y)$ in the section where y increments by 1,
detecting black change dots $P_B(x+1, Y)$ in the section where y decrements by 1, and
performing nothing with respect to a section where only x changes for the same y, assuming that both ends of section where x changes are made to the included into said section where y changes.

5. The graphic reproduction method as claimed in claim 1, wherein further comprising:
a third step of selecting at least one operation out of the set of operation consisting of:
1) an operation to output an signal generated in said second step,
2) an operation to restore said signal in said change dot memory, and
3) an operation to output a signal generated in said second step and to restore said signal and in said change dot memory.

* * * * *